United States Patent [19]
Von Loewis

[11] 3,874,406
[45] Apr. 1, 1975

[54] CONTROL VALVE ASSEMBLY

[75] Inventor: Alexander Von Loewis, Menar, Mauren, Germany

[73] Assignee: Robert Bosch GmbH, Stuttgart, Germany

[22] Filed: Feb. 28, 1973

[21] Appl. No.: 336,889

[30] Foreign Application Priority Data
Mar. 7, 1972 Germany.......................... 2210776

[52] U.S. Cl....... 137/596.17, 137/596.1, 137/627.5, 251/77
[51] Int. Cl. .................... F16k 31/02, F16k 11/10
[58] Field of Search....... 137/596.16, 596.17, 596.1, 137/596, 627.5, DIG. 2; 251/129, 138, 83, 77; 303/50, 52

[56] References Cited
UNITED STATES PATENTS

| 856,010 | 6/1907 | Wikander | 137/627.5 X |
|---|---|---|---|
| 925,673 | 6/1909 | Zook | 137/596.17 |
| 1,547,398 | 7/1925 | Jones | 137/596.1 |
| 2,184,413 | 12/1939 | Della Chiesa et al | 137/596.1 |
| 2,404,514 | 7/1946 | McClure | 137/596.17 |
| 2,724,555 | 11/1955 | Roetter | 137/627.5 X |
| 2,990,852 | 7/1961 | Simon et al | 137/596.18 |
| 3,113,432 | 12/1963 | Watson | 137/596.16 X |

FOREIGN PATENTS OR APPLICATIONS

| 1,331,025 | 4/1962 | France | 137/596 |
|---|---|---|---|

Primary Examiner—Martin P. Schwadron
Assistant Examiner—Robert J. Miller
Attorney, Agent, or Firm—Michael S. Striker

[57] ABSTRACT

A control valve assembly which can be used as an antiskid valve in the brake system of an automotive vehicle and wherein the valve body defines two chambers one of which communicates with an outlet and the other of which can communicate with an inlet for pressurized fluid. The valve body is further provided with a port for connection to a consumer and with channels which connect the port with the other chamber. A normally open first open-and-shut valve is mounted in the one chamber and a normally closed second open-and-shut valve is mounted in the other chamber. The armature of an electromagnet is movable axially in the valve body to close the first valve and to thereupon open the second valve by way of a motion-transmitting device having several elongated sections which are disposed end-to-end between the seat of the first valve and the spherical valve member of the second valve. One section has a passage which connects the port with the outlet when the first valve is open and which also connects the channels with the outlet so that the other chamber is then relieved. When the second valve is open, pressurized fluid can flow from the inlet to the consumer by way of the channels while the first valve prevents escape of fluid from the channels into the outlet. Since the sections of the motion-transmitting device merely abut against each other, they need not be machined and/or installed with a high degree of precision. The spring of the first valve biases the seat of this valve against one end of the nearest section, and the spring of the second valve biases the valve member against the adjacent end of another section.

9 Claims, 1 Drawing Figure

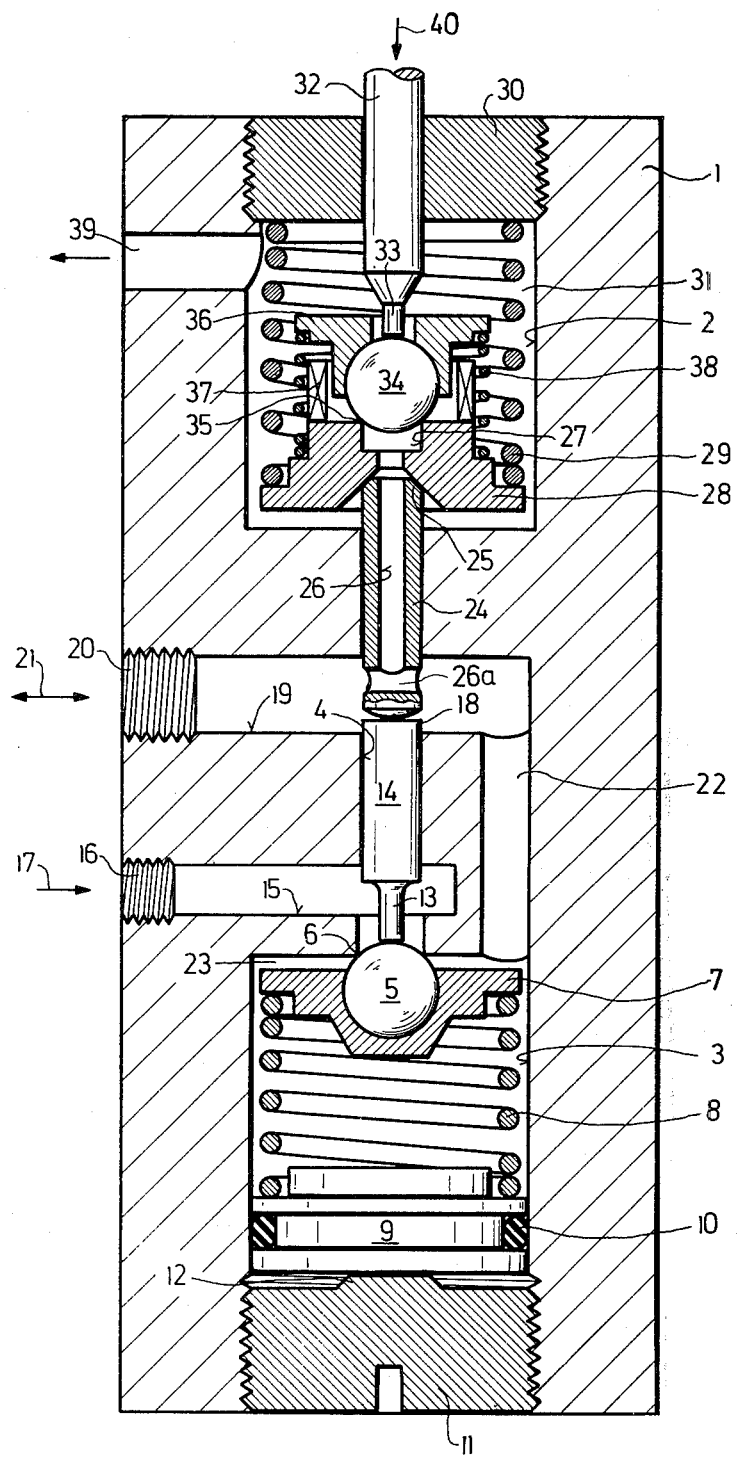

CONTROL VALVE ASSEMBLY

BACKGROUND OF THE INVENTION

The present invention relates to improvements in fluid flow controlling valves in general, and more particularly to improvements in valve assemblies wherein one of two valves controls the flow of spent fluid e.g., oil from a consumer to an outlet and the other valve controls the flow of fluid from a pressure line to the consumer. Still more particularly, the invention relates to a valve assembly wherein the movements of valve members against or away from the respective seats are preferably controlled by an electromagnet.

British Pat. No. 448,310 discloses a valve assembly wherein a first valve which controls an outlet in the valve body is automatically closed prior to opening of a second valve which controls the inflow of pressurized fluid. The device for transmitting motion to the second valve includes several sleeve-like sections which are telescoped into each other and one of which can move into abutment with a dished valve member of one of the valves to thereby seal the consumer from the outlet. Another section of the motion-transmitting device abuts against a dished valve member of the other valve.

A drawback of the just outlined valve assembly is that its parts, such as the valve members and the sections of the motion-transmitting device, must be machined with a very high degree of precision. Accurate machining is especially important for the sleeve-like sections of the motion-transmitting device which must be accurately fitted into each other and must be provided with a number of complicated surfaces. Moreover, the body of the valve assembly, too, must be machined with great care because it must receive the valve members and the sections of the motion-transmitting device with minimal clearance.

SUMMARY OF THE INVENTION

An object of the invention is to provide a novel and improved valve assembly whose valves can be actuated with the exertion of minimal forces and with minimal delay, which consists of a relatively small number of simple and inexpensive parts, and whose components need not be machined with a high degree of accuracy.

Another object of the invention is to provide the valve assembly with a simple and inexpensive valve body and with a novel motion-transmitting device which is simpler, more rugged, less expensive and longer-lasting than the presently known motion-transmitting devices.

A further object of the invention is to provide a valve assembly wherein the stressing of one or more valve springs can be effected by resorting to simple, inexpensive and rugged adjusting means and wherein the valve springs need not be specially machined and/or tested in order to be suited for use in the improved valve assembly.

An additional object of the invention is to provide a control valve assembly which can be furnished in any desired size and/or shape and wherein the bias of one or more valve springs can be adjusted without necessitating even partial dismantling of the valve assembly.

A further object of the invention is to provide a valve assembly which can employ a large number of commercially available mass-produced and inexpensive parts.

An additional object of the invention is to provide a novel and improved antiskid valve for use in brake systems of automotive vehicles.

The invention is embodied in a control valve assembly, especially in an electromagnetically operable valve assembly, which comprises a body having a fluid-admitting inlet and a fluid-discharging outlet, a first open-and-shut valve (preferably having a spherical valve member) mounted in the body to control the outflow of fluid by way of the outlet, a second open-and-shut valve (preferably having a spherical valve member) mounted in the body to control the admission of fluid by way of the inlet (e.g., to a port which is connected to a consumer and which can communicate with the outlet when the first valve is open), a composite motion-transmitting device which is movably mounted in the body between the two valves and includes a plurality of sections arranged end-to-end, means for biasing the valves against the motion-transmitting device, and actuating means (e.g., the armature of an electromagnet) which is operable to shut the first valve and to thereupon open the second valve by way of the first valve and the motion-transmitting device.

The novel features which are considered as characteristic of the invention are set forth in particular in the appended claims. The improved valve assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is an enlarged axial sectional view of a valve assembly which embodies the invention.

DESCRIPTION OF THE PREFERRED EMBODIMENTS

The drawing illustrates a valve assembly which comprises an elongated prismatic or block-shaped body or housing 1 having a composite axial bore consisting of a first bore 2 extending inwardly from one end of the body 1, a second bore 3 extending inwardly from the other end of the body 1, and a smaller-diameter intermediate bore 4 which extends between the inner ends of the bores 2 and 3. The diameter of the bore 2 preferably equals the diameter of the bore 3. The bores 2, 3 and 4 are assumed to but need not have a common axis.

The body 1 of the valve assembly is further provided with an outlet 39 which extends radially from the bore 2 and can discharge spent hydraulic fluid into a tank (not shown) and an inlet 16 which communicates with the intermediate bore 4 by way of a transversely extending channel 15. That portion of the body 1 which surrounds the lower end of the bore 4, as viewed in the drawing, defines a seat member 6 forming part of a valve which further includes a spherical valve member 5. The valve member 5 is partially embedded in a spring retainer 7 which is movable axially in the bore 3 and is biased upwardly, as viewed in the drawing, by a strong helical spring 8. The outer end portion of the spring 8 reacts against an insert 9 which is surrounded by a sealing ring 10 consisting of elastomeric material. The insert 9 is held in the illustrated position by the extension 12 of a threaded sealing plug 11 which meshes with the body 1 and is received in the outer end portion of the bore 3. By rotating the plug 11 with the help of a screwdriver or the like, the operator can change the axial position of the insert 9 to thereby change the initial stress of the spring 8 and hence the force with which the spring 8 urges the spherical valve member 5 against the seat member 6. The members 5 and 6 form an open-and-shut valve which controls the inflow of hydraulic fluid from a pressure line 17 indicated by an arrow into a chamber 23 constituting the innermost portion of the bore 3. When the valve including the seat member 6 and the valve member 5 is open, pressurized fluid can flow from the line 17 through the inlet 16 and the transversely extending channel 15, through the seat member 6 and into the chamber 23. The chamber 23 communicates with a connecting channel 22 which is parallel to the bore 4 and communicates with a second transversely extending channel 19. The latter is parallel to the channel 15 and communicates with a port 20 which is surrounded by internal threads so that the corresponding portion of the body 1 can be connected to a consumer line, not shown. The directions in which the fluid can flow into and from a consumer by way of the port 20 are indicated by a double-headed arrow 21.

The bore 2 accommodates a second open-and-shut valve which includes a seat member 35 forming part of an annular spring retainer 28 and a spherical valve member 34. The valve including the members 34 and 35 controls the outflow of fluid by way of the outlet 39. The spring retainer 28 is biased inwardly toward the bore 4 by a relatively strong helical spring 29 reacting against a hollow threaded lug 30 which is in mesh with the body 1 and is received in the outer end portion of the bore 2. The valve member 34 is partially surrounded by and connected to, for instance by a press fit, an annular guide 36 which is biased away from the spring retainer 28 by a weak or light spring 38. The spring retainer 28 has a confining portion or skirt 37, provided with radial openings, which surrounds the smaller-diameter portion of the annular guide 36 with a certain amount of clearance. The spring retainer 28 is provided with a composite axially extending bore 27 the innermost part of which is of conical shape and diverges toward the bore 4. The plug 30 may but need not be in sealing engagement with the valve body 1.

In accordance with a feature of the invention, the valve assembly further comprises a composite elongated motion-transmitting device which is interposed between the open-and-shut valves in the bores 2 and 3 and includes a plurality of discrete sections mobable axially in the bore 4 and arranged end-to-end. The first section 14 of the motion-transmitting device is received in the bore 4 between the channels 15 and 19 and has an end portion or stub 13 which extends with clearance into the seat member 6 and abuts against the spherical valve member 5. A hollow second section 24 of the motion-transmitting device has a conical end portion 25 which abuts against the spring retainer 28 and a rounded end portion which abuts against the adjacent end portion 18 of the section 14. The section 24 has a passage including an axially extending portion 26 which communicates with a bore 27 of the spring retainer 28 and a radially extending portion 26a which establishes communication between the portion 26 and the channel 19. It will be noted that, when the valve including the members 34, 35 in the bore 2 is open, fluid can flow between the outlet 39 and the port 20 as well as between the outlet 39 and the chamber 23 in the bore 3. When the valve including the members 5 and 6 is open, fluid can flow from the inlet 16 into the connecting channel 22 and therefrom to the consumer by way of the port 20.

The valve assembly further includes an axially movable rod-like actuating member 32 which is reciprocable in the axial bore of the threaded plug 30 and has a smaller-diameter tip 33 which abuts against the valve member 34. The actuating member 32 is assumed to constitute or to receive motion from the armature of an electromagnet (not shown). When the electromagnet is energized, the actuating member 32 is caused to move in the direction indicated by an arrow 40 so as to urge the valve member 34 against the seat member 35 whereby the valve including the members 34 and 35 is closed to prevent the outflow of fluid by way of the outlet 39. As the actuating member 32 continues to move in the direction indicated by the arrow 40, it causes the valve including the members 34 and 35 to shift the motion-transmitting device including the sections 24 and 14 whereby the stub 13 of the section 14 moves the valve member 5 away from the seat member 6 to open the valve which controls the inflow of pressurized fluid by way of the inlet 16. In the illustrated embodiment, the section 14 of the motion-transmitting device is assumed to be a solid cylindrical body.

The pressure of fluid in the inlet 16 acts against that portion of the spherical valve member 5 which is surrounded by the seat member 6. It is assumed that the diameter of the opening in seat member 6 is only about 2 mm. The spring 29 in the bore 2 urges the retainer 28, and therefore the seat member 35, against the section 24 of the motion-transmitting device in the bore 4, whereby the section 14 urges its stub 13 to move the valve member 5 away from the seat member 6. In other words, the spring 29 assists the fluid pressure in the seat member 6 and exhibits the tendency to open the valve including the members 5 and 6. The initial stress of the spring 8 is selected in such a way that this spring can effectively resist the opening of valve including the members 5 and 6 even when the fluid pressure in the inlet 16 reaches a maximum permissible value. Thus, the valve including the members 5 and 6 can be opened only in response to operation of the actuating member 32 whereby the valve member 5 moves away from the seat member 6 in response to axial displacement of the actuating member 32, in response to resulting displacement of the entire valve including the members 34 and 35, and further in response to axial displacement of the motion-transmitting device including the sections 14 and 24. As mentioned before, the initial stress of the spring 8 can be adjusted in response to rotation of the sealing plug 11 in the outer portion of the bore 3.

If desired, the spring retainer 28 can be made integral with the section 24 of the motion-transmitting device. The reference character 31 denotes a chamber which constitutes a portion of the bore 2 and accommodates the valve including the members 34 and 35. The pressure in the chamber 31 always equals the fluid pressure in the tank, i.e., in the outlet 39. The chamber 23 is relieved when the valve including the members 5 and 6 is closed; the pressure in the chamber 23 then equals the pressure in the outlet 39 if the valve including the members 34 and 35 is open. The pressure in the chamber 23 can rise to match the maximum pressure of fluid in the pressure line 17 when the valve in the bore 3 is opened in response to operation of the actuating member 32.

The operation of the valve assembly is as follows:

It is assumed that the valve including the members 5 and 6 is closed so that the inlet 16 is sealed from the channel 22 and from the consumer (see the port 20). It is further assumed that the valve in the chamber 31 is open because the actuating member 32 allows the light spring 38 to expand and to move the valve member 34 away from the seat member 35. Therefore, fluid can flow from the consumer by way of the port 20, channel 19, the passage 26a, 26 of the section 24, the bore 27 of the spring retainer 28, chamber 31 and outlet 39. The chamber 23 is also relieved because it can communicate with the outlet 39 by way of the channels 22 and 19, passage 26a, 26, bore 27 and chamber 31.

As mentioned before, the pressure in the inlet 16 and channel 15 acts upon the uppermost portion of the valve member 5, as viewed in the drawing, and urges this valve member toward an open position against the opposition of the strong helical spring 8. Since the diameter of the opening in the seat member 6 is relatively small (for example, 2 mm.), the initial stress of the spring 8 can be readily selected in such a way that this spring counteracts the tendency of the valve member 5 to move away from the seat member 6 under the action of fluid pressure in the channel 15 and under the action of the spring 29 in the bore 2. It will be noted that the bias of the spring 29 is also adjustable in response to rotation of the plug 30 in the outermost portion of the bore 2. It will further be noted that one member of each of the two open-and-shut valves in the body 1 is biased against the respective end of the motion-transmitting device in the bore 4. Thus, the spring 29 urges the spring retainer 28 (which includes the seat member 35 of the valve in the chamber 31) against the end portion 25 of the section 24, and the spring 8 urges the spherical valve member 5 of the valve in the chamber 23 against the stub 13 of the section 14. This insures that the rounded lower end of the section 24 is in permanent abutment with the end portion 18 of the section 14. An advantage of such mounting of the springs 8 and 29 is that the sections of the motion-transmitting device invariably abut against each other even if that portion of the bore 4 which receives the section 24 is offset or even inclined relative to that portion of the bore 4 which receives the section 14. In other words, the two portions of the bore 4 need not be machined with a high degree of precision. Also, the provision of a smaller-diameter stub 13 at the lower end of the section 14 renders it possible to machine the seat member 6 with a relatively small degree of precision; for example, the axis of this seat member need not coincide with the axis of the bore 4.

If the operator decides to operate the actuating member 32 by moving it in the direction indicated by the arrow 40, the tip 33 of the moving actuating member 32 presses the spherical valve member 34 against the seat member 35 so that the valve which controls the outlet 39 closes. Further inward movement of the actuating member 32 results in axial displacement of the motion-transmitting device by way of the spring retainer 28 whereby the stub 13 lifts the valve member 5 off the seat member 6 so that the valve in the chamber 23 opens and permits pressurized fluid to flow from the inlet 16, by way of the channel 15 and seat member 6, and into the chamber 23. The fluid then flows from the chamber 23 by way of the channels 22, 19 and port 20 to the consumer. Such fluid cannot flow into the outlet 39 because the valve including the members 34, 35 is closed. As the valve including the members 5 and 6 opens, the pressure in the chamber 23 rises from zero toward the maximum pressure in the line 17. Also, the pressure in the consumer rises from zero to the pressure of fluid in the line 17 as soon as the pressure of fluid in the channel 15 matches the fluid pressure in the channel 19; therefore, the fluid then does not exhibit a tendency to flow around the section 14 of the motion-transmitting device. Consequently, this section of the motion-transmitting device need not be mounted in the corresponding portion of the bore 4 with a high degree of accuracy. Furthermore, the sections 14, 24 of the motion-transmitting device can be mass-produced of inexpensive material (e.g., a metal or a plastic) and can be installed in the valve body 1 with substantial freedom of lateral movement. The springs 8 and 29 invariably insure that the sections 14 and 24 abut against each other during each stage of operation and the movability of spring retainers 7, 28 in the respective chambers 23, 31 insures that the valve assembly will operate properly even if the length of the section 14 and/or 24 is not selected with a high degree of precision or if the length of sections in successively assembled apparatus deviates from a standard length.

The spring 8 insures that the spherical valve member 5 always finds its seat member 6 when the valve in the chamber 23 is allowed to close. Analogously, the spring 29 insures that the spherical valve member 34 always finds its seat member 35 when the actuating member 32 is caused to move in the direction indicated by the arrow 40. It will be noted that the spring retainers 7 and 28 can be mounted in the respective chambers 23, 31 with substantial freedom of radial movement.

When the pressure against the actuating member 32 is terminated, the spring 8 expands and closes the valve in the chamber 23 to thus seal the inlet 16 from the port 20. At the same time, the light spring 38 expands and moves the valve member 34 off the seat member 35 so that the valve in the chamber 31 opens and connects the consumer (port 20) with the outlet 39. The force which is required to move the actuating member 32 in the direction indicated by the arrow 40 is relatively small; therefore, this actuating member can constitute the armature of a relatively weak electromagnet. Furthermore, the time which is required to close the valve in the chamber 31 and to thereupon open the valve in the chamber 23 is extremely short. Therefore, the valve assembly can be used with great advantage as an antiskid valve in brake systems for automotive vehicles where rapid opening and closing of paths for the flow of a fluid is of great importance. The manufacturing cost of the valve assembly is relatively low because its parts need not be machined with a high degree of precision. The operating cost is also low because the actuating member 32 can be displaced to open the valve in chamber 23 with the exertion of a relatively small force.

Each brake line of the brake system for an automotive vehicle normally embodies an antiskid valve. If the assembly of the present invention is used as an antiskid valve, the valve member 5 moves away from the seat member 6 in the course of a normal braking operation so that pressurized fluid can flow from the inlet 16 to the consumer (port 20). During skidding of a wheel, the valve 5, 6 is closed and the valve 34, 35 is open to reduce the fluid pressure in the brake cylinder because the fluid can flow from the consumer (port 20), via outlet 39 and into the tank. The positions of valve members 5, 34 may change as often as 2–5 times per second.

Brake systems which can utilize the valve assembly of the present invention are disclosed, for example, in the commonly owned copending application Ser. No. 332,168 filed Feb. 13, 1973, now Pat. No. 3,787,095; by von Lowis of Menar and in the commonly owned copending application Ser. No. 333,293 filed Feb. 16, 1973, now Pat. No. 3,829,166 by von Lowis of Menar et al.

The improved valve assembly exhibits a number of additional advantages. For example, neither the length nor the spring characteristic of the helical spring 29 must match the length and/or the spring characteristic of the helical spring 8. Each of these springs can be taken from a supply of commercially available helical springs and need not be inspected with a high degree of accuracy because the bias of the spring 8 can be readily adjusted by the plug 11 so as to insure that this spring normally maintains the valve including the members 5, 6 in closed position against the opposition of fluid pressure in the opening of the seat member 6 and against the opposition of the spring 29. It is further clear that the bias of the spring 8 need not be adjusted if the operator decides to adjust the initial stress of the spring 29 by rotating the plug 30. As mentioned before, the adjustment of spring 8 and/or 29 should be such that the valve including the members 5, 6 does not open in response to maximum permissible fluid pressure in the channel 15 when the actuating member 32 is not operated to move in the direction of the arrow 40, i.e., when the spring 38 is free to expand.

The manufacturing cost of a motion-transmitting device whose sections merely abut against each other under the action of commercially available springs is much lower than that of a motion-transmitting device which consists of several interfitted (e.g., telescoped) tubular sections having complicated internal and/or external surfaces.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of my contribution to the art and, therefore, such adaptations should and are intended to be comprehended within the meaning and range of the equivalence of the following claims.

What is claimed as new and desired to be protected by Letters Patent is set forth in the appended.

1. A control valve assembly, particularly an electromagnetic valve assembly, comprising a body having a fluid-admitting inlet and a fluid discharging outlet; a first open-and-shut valve mounted in said body to control the outflow of fluid by way of said outlet; a second open-and-shut valve mounted in said body to control admission of fluid by way of said inlet, each of said valves comprising a seat member and a valve member and the latter being movable relative to the seat member between sealing and fluid-admitting positions; a motion transmitting device including a first and a second section arranged end to end, said first section abutting against the seat member of one of said valves and said second section abutting against the valve member of the other of said valves; biasing means including a first spring arranged to urge said seat member of said one valve against said first section and a second spring arranged to urge said valve member of said other valve against said second section; and actuating means operable to shut said first valve and thereupon open said second valve by way of said first valve and said motion transmitting device.

2. A valve assembly as defined in claim 1, wherein the valve member of at least one of said valves is a spherical valve member.

3. A valve assembly as defined in claim 1, wherein the valve member of each of said valves is a spherical valve member.

4. A valve assembly as defined in claim 1, wherein said valve member of said other valve includes a portion which is exposed to fluid pressure in said inlet whereby such pressure tends to open said other valve, said second spring being arranged to counteract the tendency of said other valve to open in the absence of operation of said actuating means.

5. A valve assembly as defined in claim 1, wherein at least one of said sections of said motion-transmitting device has a passage for the flow of fluid therethrough.

6. A valve assembly as defined in claim 1, wherein said actuating means constitutes the movable armature of an electromagnet.

7. A valve assembly as defined in claim 1, wherein said body is further provided with a port and channel means connecting said port with said inlet in the open position of said other valve, said motion-transmitting device having a passage which connects said channel means with said outlet in the open position of said one valve.

8. A valve assembly as defined in claim 1, wherein said means for biasing comprises a plurality of prestressed springs and further comprising means for adjusting the stress of at least one of said springs.

9. A valve assembly as defined in claim 1, further comprising means for biasing said valve member away from said seat member of said one valve with a force which is overcome in response to operation of said actuating means.

* * * * *